(12) United States Patent
Koyagi

(10) Patent No.: US 8,342,974 B2
(45) Date of Patent: Jan. 1, 2013

(54) BALL SPLINE

(75) Inventor: Katsura Koyagi, Kashiwara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 38 days.

(21) Appl. No.: 12/737,289

(22) PCT Filed: Jul. 1, 2009

(86) PCT No.: PCT/JP2009/062057
§ 371 (c)(1),
(2), (4) Date: Dec. 27, 2010

(87) PCT Pub. No.: WO2010/001936
PCT Pub. Date: Jan. 7, 2010

(65) Prior Publication Data
US 2011/0111867 A1    May 12, 2011

(30) Foreign Application Priority Data

Jul. 2, 2008    (JP) ................. P2008-172866

(51) Int. Cl.
*F16C 3/03* (2006.01)
*F16C 29/06* (2006.01)
(52) U.S. Cl. ......................................... 464/168; 384/43
(58) Field of Classification Search .................. 464/168; 384/43
See application file for complete search history.

(56) References Cited

U.S. PATENT DOCUMENTS

| | | | | |
|---|---|---|---|---|
| 3,357,754 A | * | 12/1967 | Betrix | 384/43 |
| 3,540,782 A | * | 11/1970 | Worm | |
| 4,634,296 A | * | 1/1987 | Watanabe | 464/168 |
| 5,184,898 A | * | 2/1993 | Kito | 384/43 |
| 5,476,325 A | | 12/1995 | Ishihara | |
| 5,554,899 A | | 9/1996 | Teramachi | |
| 6,135,638 A | * | 10/2000 | Agari | 384/43 |
| 2009/0100949 A1 | | 4/2009 | Shirai et al. | |

FOREIGN PATENT DOCUMENTS

| | | |
|---|---|---|
| JP | S47-12963 | 4/1972 |
| JP | S48-16040 A | 3/1973 |
| JP | 5-71445 | 9/1993 |
| JP | 6-300106 A | 10/1994 |
| JP | 7-233815 A | 9/1995 |
| JP | 07233815 * | 9/1995 |
| JP | 2003-130050 A | 5/2003 |
| WO | WO 2007/023634 A1 | 3/2007 |
| WO | WO 2007/026702 A1 | 3/2007 |

* cited by examiner

*Primary Examiner* — Gregory Binda
*Assistant Examiner* — Josh Skroupa
(74) *Attorney, Agent, or Firm* — McGinn IP Law Group, PLLC

(57) ABSTRACT

A ball spline includes a connecting part of a cage of a spline nut has a turning ball receiving part adapted to receive balls which are turning from a no-load raceway part, and a turned ball receiving part adapted to receive the balls which are forwarded to a main passage after turning. An outer diameter of the turning ball receiving part is made larger than an outer diameter of the turned ball receiving part.

5 Claims, 2 Drawing Sheets

BALL SPLINE

TECHNICAL FIELD

The present invention relates to a ball spline.

BACKGROUND ART

As the ball spline, there has been known a ball spline including a spline shaft having a plurality of linear spline grooves extending in an axial direction which are formed on an outer peripheral face of the spline shaft, a spline nut provided with ball circulation passages corresponding to the spline grooves of the spline shaft and through which the spline shaft is passed, and a plurality of balls which are disposed in the ball circulation passages of the spline nut, wherein the spline nut includes a nut body which has spline grooves corresponding to the spline grooves of the spline shaft thereby to form main passages, and a cage which is fixed to an inner periphery of the nut body and forms return passages between the cage and the nut body (Reference should be made to Patent Document 1).

In the ball spline as described above, each of the return passages includes a no-load raceway part which is parallel to the main passage, and a connecting part for connecting the main passage and the no-load raceway part, and the no-load raceway part is provided radially outside than the main passage.

Prior Art Document

Patent Document

Patent Document 1: Japanese Patent Publication No. JP-A-H06-300106

SUMMARY OF THE INVENTION

Problems that the Invention is to Solve

In the ball spline of this type, it is desired that a difference between a P.C.D. of loaded balls (a diameter of the main passage) and a P.C.D. of circulating balls (a diameter of the no-load raceway part) is made smaller, for the purpose of reducing a diameter of the whole ball spline. For this purpose, it is considered that when the spline grooves are formed on the outer periphery of the spline shaft, an outer diameter of a part interposed between a pair of the spline grooves is made larger (In other words, the spline shaft has different diameters) thereby to increase the P.C.D. of the loaded ball.

However, in order to obtain the shaft having the different diameters as described above, the spline shaft must be mechanically worked so that the other parts except the part interposed between a pair of the spline grooves may be made smaller in diameter. Because a machining allowance is large, a long time mechanical work is required, and so, there is such a problem that working cost is increased.

An object of the invention is to provide a ball spline in which a difference between a P.C.D. of loaded balls and a P.C.D. of circulating balls can be made smaller, without making a spline shaft different in diameter.

Means for Solving the Problems

The ball spline according to the invention includes a spline shaft having a plurality of linear spline grooves extending in an axial direction which are formed on an outer peripheral face of the spline shaft, a spline nut which is formed with ball circulation passages corresponding to the spline grooves of the spline shaft and through which the spline shaft is passed, and a plurality of balls which are disposed in the ball circulation passages of the spline nut, the spline nut including a nut body having spline grooves corresponding to the spline grooves of the spline shaft thereby to form main passages, and a cage which is fitted to an inner periphery of the nut body and forms, between the cage and the nut body, return passages each including a no-load raceway part which is parallel to the main passage and a connecting part for connecting the main passage and the no-load raceway part, and the ball spline is characterized in that the spline shaft is the one which is formed with the spline grooves on a circumferential face thereof having no projected part, the connecting part of the cage of the spline nut has a turning ball receiving part for receiving the balls which are turning from the no-load raceway part, and a turned ball receiving part continued from the turning ball receiving part for receiving the balls which are forwarded to the main passage after turning, and an outer diameter of the turning ball receiving part is made larger than an outer diameter of the turned ball receiving part.

The ball circulation passage is composed of the main passage, the no-load raceway part which is parallel to the main passage, and the connecting part for connecting the main passage and the no-load raceway part. The balls which roll through the main passage guide relative linear motions of the spline shaft and the spline nut. The balls which have rolled through the main passage enter into the connecting part from its one end, then, roll through the no-load raceway part in a reverse direction, and return to the main passage again from the other end side. This circulation is made.

The no-load raceway part is formed in parallel with the main passage and radially outside than the main passage. The spline grooves of the nut body are formed in a protruded part which is protruded inward with respect to a plane corresponding to the no-load raceway part. Therefore, the connecting part is U-turned in an axial direction from an end of the no-load raceway part to an end of the main passage, and has a reduced diameter.

"The spline shaft which is formed with the spline grooves on a circumferential face thereof having no projected part" means that this is not the spline shaft having different diameters which is provided with the projected part (a large diameter part) and formed with the spline grooves at both sides of the projected part in a circumferential direction. The spline shaft can be obtained by cutting a round rod having a round sectional shape to form the spline grooves. The spline grooves include the grooves for receiving clockwise rotation and the grooves for receiving counterclockwise rotation in pairs. A plurality of these pairs (three pairs, for example) are formed on the spline shaft. Correspondingly, the spline nut has the spline grooves which are opposed to the spline grooves for receiving the clockwise rotation from the clockwise direction, and the spline grooves which are opposed to the spline grooves for receiving the counterclockwise rotation from the counterclockwise direction respectively formed on the inner periphery of the spline nut.

The balls which have circulated up to the end of the no-load raceway part turn inside the connecting part to be forwarded to the main passage. In the connecting part, there are a turning ball receiving part for receiving the balls which are turning from the no-load raceway part, and a turned ball receiving part continued from the turning ball receiving part for receiving the balls which are forwarded to the main passage after turning. A force which the balls turning inside the connecting part receive is not in a direction of the main passage, but inclined with respect to the main passage. Therefore, there is such possibility that the balls which are turning may override the connecting part of the cage, and smooth turning performance is hindered. In case where the spline shaft is provided with the spline grooves on the circumferential face thereof having no projected part, the possibility of overriding is enhanced.

In view of the above, in the conventional cage, the outer diameter of the turning ball receiving part is made equal to the outer diameter of the turned ball receiving part, and the outer peripheral face of the cage extending from the connecting part to the main passage is made smooth. In contrast, in the cage of the ball spline according to the invention, the outer diameter of the turning ball receiving part is made larger than the outer diameter of the turned ball receiving part. The balls which are turning receive the force in the direction inclined with respect to the direction of the main passage, and the balls which have turned receive only the force in the direction of the main passage. Therefore, the turning ball receiving part is a region where the balls are most likely to override. By making the outer diameter of the turning ball receiving part larger, the balls are prevented from overriding the connecting part and dropping, while the balls are turning through the return passage. As the results, circulating performance of the balls is enhanced.

Although an inner diameter of the nut body in a part corresponding to the turning ball receiving part of the cage is made larger so as to correspond to the cage, as compared with the conventional ball spline, it is unnecessary to modify the other parts of the nut body. In this manner, by modifying only the cage, it is possible to prevent deterioration of the circulating performance of the balls, which is the problem when the difference between the P.C.D. of the loaded ball and the P.C.D. of the circulating ball is made smaller, and the diameter of the ball spline can be reduced.

In some cases, the ball spline may include a screw shaft which is provided with ball screw raceways and spline grooves extending in an axial direction in combination with a ball screw, a ball screw nut which is rotatable and screw-fitted to the ball screw raceways of the screw shaft, and a ball spline nut which is engaged with the spline grooves interposing balls thereby to guide a linear motion of the screw shaft in the axial direction.

The screw shaft and the ball spline nut may be formed of carbon steel such as S45C, S55C or steel such as SAE4150. Moreover, the ball may be formed of bearing steel (SUJ2), for example.

Advantage of the Invention

According to the ball spline of the invention, the outer diameter of the turning ball receiving part for receiving the balls which are turning from the no-load raceway part is larger than the outer diameter of the turned ball receiving part for receiving the balls which have turned to be forwarded to the main passage. Therefore, by contriving shape of the cage, drop of the circulating balls when they turn is prevented. In this manner, deterioration of the circulating performance of the balls, which makes trouble in case where the difference between the P.C.D. of the loaded balls and the P.C.D. of the circulating balls is made smaller, is prevented, and the diameter of the ball spline can be reduced.

MODE FOR CARRYING OUT THE INVENTION

Figure 1:
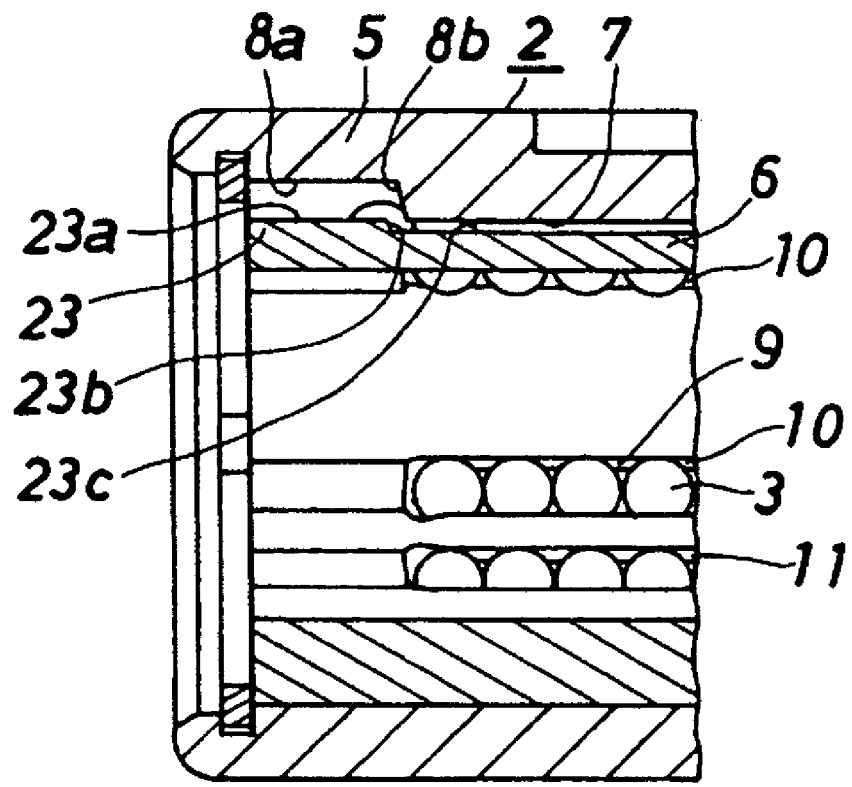
FIG. 1 is a vertical sectional view showing a ball spline according to the invention.

Now, an embodiment of the invention will be described referring to the drawings.

Figure 2:
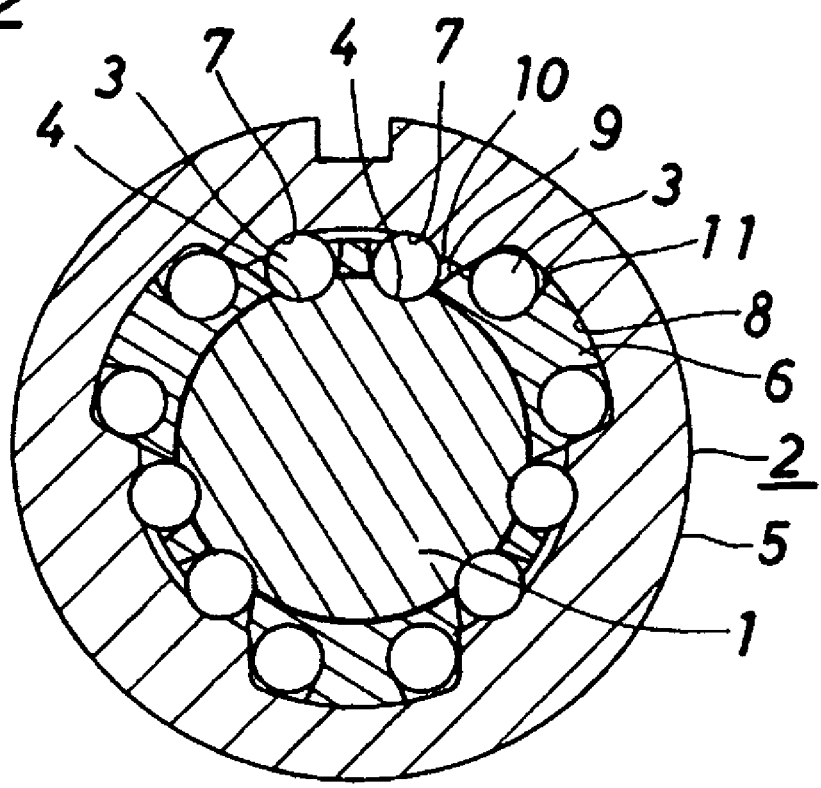
FIG. 2 is a cross sectional view of the ball spline according to the invention.
Figure 3:
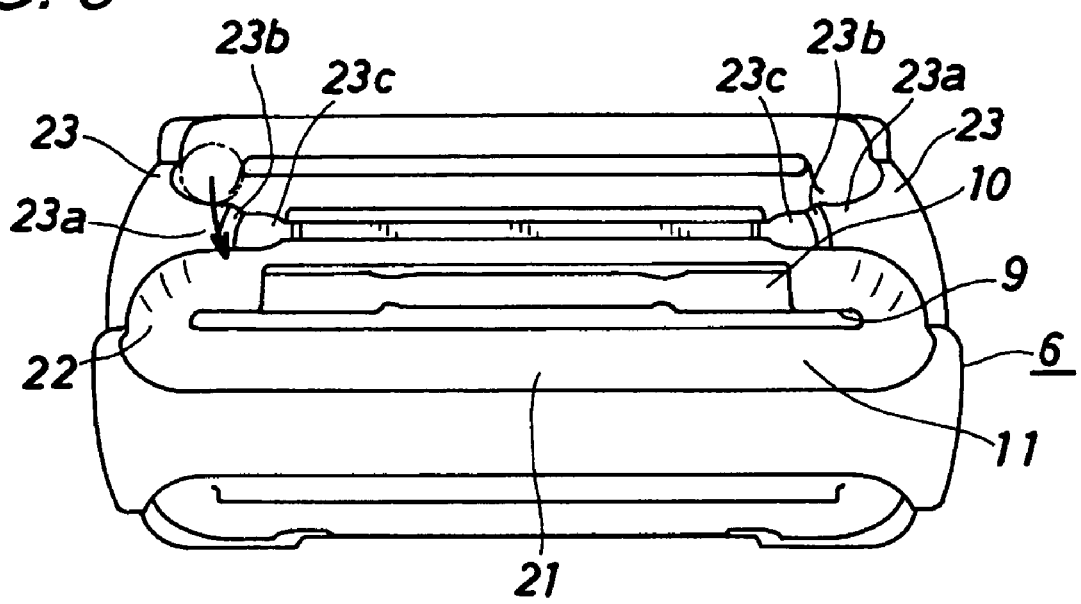
FIG. 3 is a perspective view showing a cage of the ball spline according to the invention.

FIGS. 1 to 3 show the ball spline according to the invention.

The ball spline includes a spline shaft 1 formed of steel and extending in a lateral direction, a spline nut 2, and a number of balls 3.

The spline shaft 1 is a solid shaft having a round shape in cross section, and a plurality of linear spline grooves 4 extending in an axial direction (the lateral direction) are formed on an outer peripheral face of the spline shaft 1. Specifically, the spline shaft 1 does not have different diameters, but is obtained by cutting a circumferential face of a round rod which has a round shape in cross section without a projected part, thereby to form the spline grooves 4.

The spline nut 2 includes a nut body 5 in a substantially cylindrical shape which is formed of metal, and a cage 6 in a substantially cylindrical shape which is fixed to an inner periphery of the nut body 5. The spline nut 2 is engaged with the outer periphery of the spline shaft 1 leaving a slight gap in a radial direction around the outer periphery.

A plurality of linear spline grooves 7 corresponding to the spline grooves 4 of the spline shaft 1 are formed on the inner peripheral face of the nut body 5.

In those parts of the cage 6 corresponding to the spline grooves 7 of the nut body 5, convex parts 9 for guiding the balls 3 which roll between the two spline grooves 4 and 7 are formed. Spaces between the respective spline grooves 4 and 7 which are opposed at both sides of the convex parts 9 constitute main passages 10 through which the balls 3 roll. Each of the main passages 10 includes a passage subjected to rotation torque of clockwise rotation and a passage subjected to rotation torque of counterclockwise rotation in pairs, and three pairs are provided.

There are formed in the cage 6, between the cage 6 and the nut body 5, return passages 11 which are connected to both ends of the main passages 10. Each of the return passages 11 is so provided as to sandwich the main passage 10 in the pair from both sides in a circumferential direction. The return passages 11 which are formed in the cage 6 are open outward in a radial direction, and the nut body 5 is provided with large diameter inner peripheral faces 8 for covering the open parts.

The balls 3 are disposed in the main passages 10 and the return passages 11 in such a manner that the balls 3 rolling through the main passages 10 guide relative linear motions of the spline shaft 1 and the spline nut 2. A ball circulation passage is composed of the main passages 10 and the return passages 11.

As a structure for forming each of the return passages 11, as shown in FIG. 3, the cage 6 is provided with a no-load raceway part 21 which is parallel to the main passage 10 and positioned radially outside than the main passage 10, and a connecting part 22 which connects respective ends of the no-load raceway part 21 and respective ends of the main passage 10.

A part 23 of the connecting part 22 at a side close to the main passage 10 has a turning ball receiving part 23a adapted to receive the balls 3 which are turning from the no-load raceway part 21, and a turned ball receiving part 23c continued from the turning ball receiving part 23a and adapted to receive the balls which are forwarded to the main passage 10 after turning.

Between the turning ball receiving part 23a and the turned ball receiving part 23c, there is formed a step difference part 23b, so that an outer diameter of the turning ball receiving part 23a is made larger than an outer diameter of the turned ball receiving part 23c. The inner peripheral face 8a of the nut body 5 corresponding to the turning ball receiving part 23a of the cage 6 is continued to a part which is inward in the axial direction, having a larger step difference 8b than in the conventional case.

On occasion of relative movement between the spline shaft 1 and the spline nut 2, the balls 3 rolling through the main passage 10 are introduced into the return passage 11 from one end part of the main passage 10 and move inside the return passage 11 toward the other end part of the main passage 10 to be introduced into the other end part of the main passage 10. While the balls 3 are turning inside the connecting part 22, the balls 3 are subjected to a force in a direction inclined with respect to the direction of the main passage, as shown by an arrow mark in FIG. 3. In case where the turning ball receiving part 23a for receiving the balls 3 which are turning is low in height, the balls 3 may run upon or overpass the turning ball receiving part 23a, and there is such possibility that smooth circulation of the balls 3 may be hindered.

According to the ball spline of the invention, the outer diameter of the turning ball receiving part 23a is made larger, and therefore, the balls 3 can be guided by the turning ball receiving part 23a thereby to reliably move from the return passage 11 to the main passage 10. As the results, deterioration of the circulating performance of the balls is prevented, without making the P.C.D. (the diameter of the non-load raceway part 11) of the circulating balls larger.

Moreover, in the above described embodiment, the ball spline which is provided with the spline shaft 1 having only the spline grooves 4 formed has been described. However, the ball spline according to this invention can be also used together with a ball screw which is provided with a spline shaft formed with a single screw groove, a nut for screw, and balls for screw.

The invention claimed is:

1. A ball spline comprising:
    a spline shaft having a plurality of linear spline grooves extending in an axial direction which are formed on an outer peripheral face of the spline shaft,
    a spline nut which is formed with ball circulation passages corresponding to the spline grooves of the spline shaft and through which the spline shaft is passed, and
    a plurality of balls which are disposed in the ball circulation passages of the spline nut,
    wherein the spline nut includes:
        a nut body having spline grooves corresponding to the spline grooves of the spline shaft thereby to form main passages; and
        a cage which is fitted to an inner periphery of the nut body and forms, between the cage and the nut body, return passages each including a no-load raceway part which is parallel to the main passage and a connecting part for connecting the main passage and the no-load raceway part,
    wherein the spline shaft is formed with the spline grooves on a circumferential face thereof having no projected part, and
    wherein the connecting part of the cage of the spline nut includes a turning ball receiving part for receiving the balls which are turning from the no-load raceway part, and a turned ball receiving part continued from the turning ball receiving part for receiving the balls which are forwarded to the main passage after turning, and an outer diameter of the turning ball receiving part is made larger than an outer diameter of the turned ball receiving part.

2. The ball spline according to claim 1, wherein diameters of the spline shaft between spline grooves are substantially equal.

3. The ball spline according to claim 1, wherein a diameter of the spline shaft between a spline groove of the plurality of spline grooves and an adjacent spline groove of the plurality of spline grooves disposed on a side of the spline groove is substantially equal to a diameter of the spline shaft between the spline groove and an other adjacent spline groove of the plurality of spline grooves disposed on an other side of the spline groove.

4. The ball spline according to claim 1, wherein a step difference part is disposed between the turning ball receiving part and the turned ball receiving part.

5. The ball spline according to claim 1, wherein a diameter of the spline shaft other than portions of a circumference of the spline shaft including the spline grooves, is constant.

* * * * *